(No Model.) 2 Sheets—Sheet 1.

S. J. REYNOLDS.
ADJUSTABLE DESK.

No. 491,249. Patented Feb. 7, 1893.

WITNESSES:
George A. McLaudress.
George W. Hudson.

Sylvanus J. Reynolds INVENTOR

BY
his ATTORNEY (No Model.) 2 Sheets—Sheet 2.
S. J. REYNOLDS.
ADJUSTABLE DESK.

No. 491,249. Patented Feb. 7, 1893.

WITNESSES:
C. S. Matson.
Fannie Robbins.

INVENTOR
Sylvanus J. Reynolds
BY
A. H. Swartwout
ATTORNEY

UNITED STATES PATENT OFFICE.

SYLVANUS J. REYNOLDS, OF SAGINAW, MICHIGAN.

ADJUSTABLE DESK.

SPECIFICATION forming part of Letters Patent No. 491,249, dated February 7, 1893.

Application filed June 29, 1892. Serial No. 438,406. (No model.)

*To all whom it may concern:*

Be it known that I, SYLVANUS J. REYNOLDS, a citizen of the United States, residing at Saginaw, in the county of Saginaw and State of Michigan, have invented certain new and useful Improvements in Adjustable Desks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to writing desks, its object being to provide a desk that can be readily adjusted from a sitting to a standing desk.

I am aware that others have made adjustable desks, but I claim for my desk easier adjustability, and firmness and rigidity when adjusted to any position, not accomplished by others.

Figure 1:
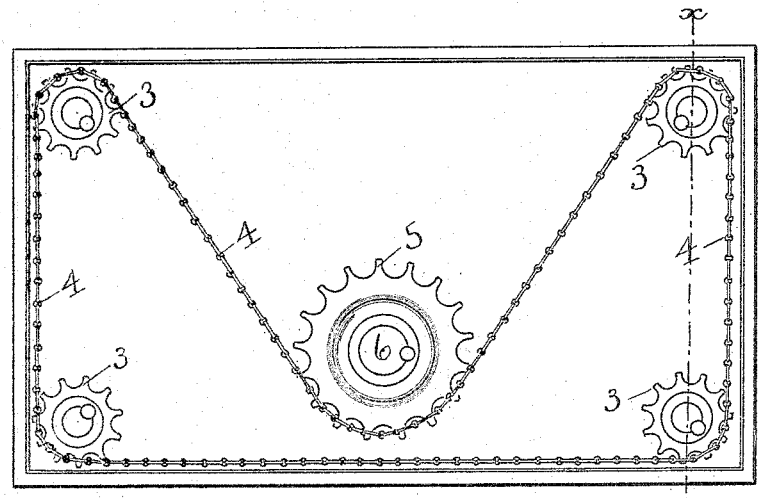
Figures 2, 3, 4:
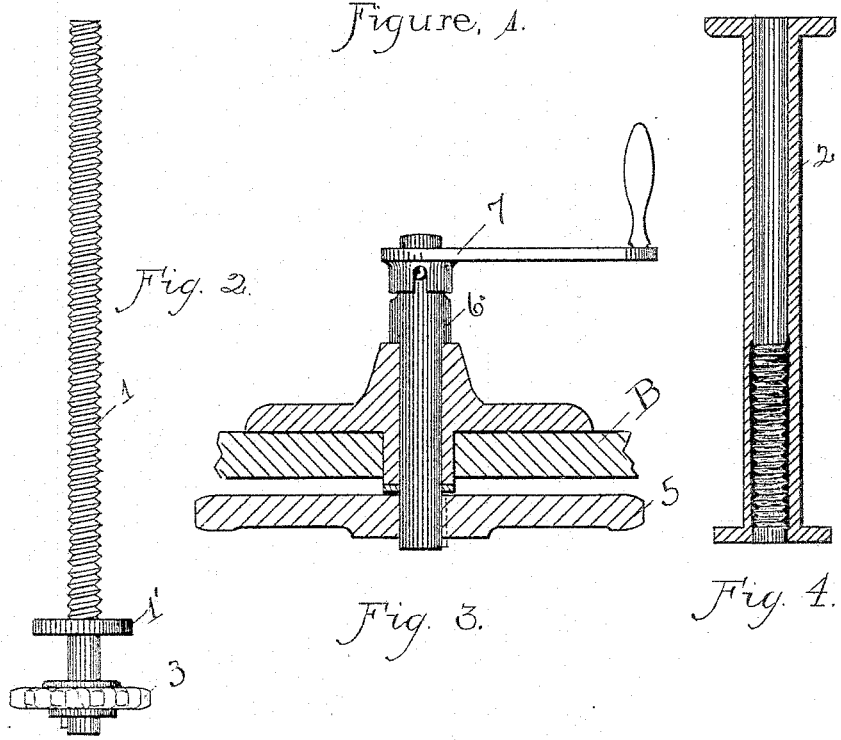
Figure 5:
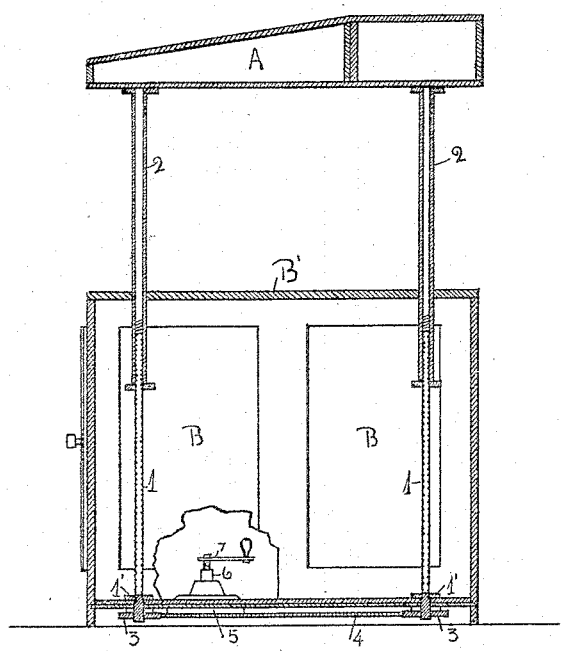
Figure 6:
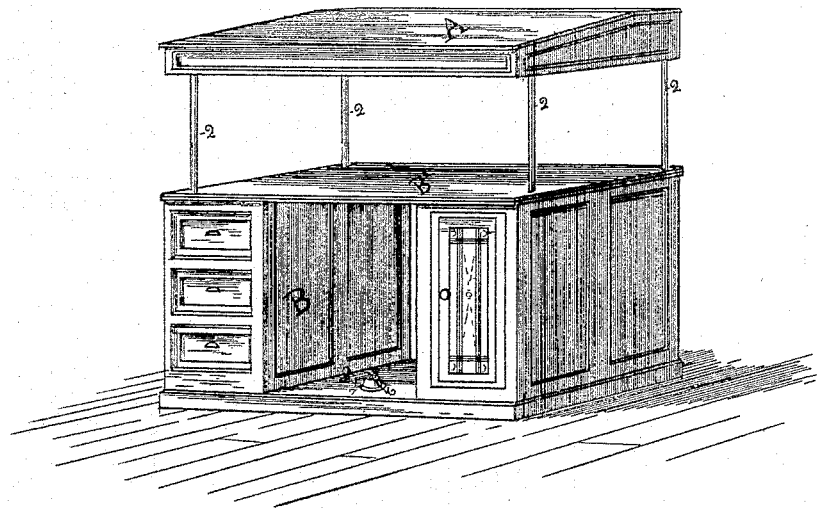

In the drawings, Figure 1, is a view of the underside of the bottom of the desk. Fig. 2, the screw leg 1. Fig. 3, a section of the crank shaft and sprocket wheel. Fig. 4, the nut or hollow leg 2. Fig. 5, is a sectional view of the end of the desk on line $x-x$ of Fig. 1. Fig. 6, the desk elevated.

A is the top of the desk.

B is the body of the desk, and may consist of drawers, &c. as illustrated.

B' is the top of the body B, and used when the top A is elevated.

1, 1, 1, 1, are screw legs. To the lower ends of these legs and underneath the desk are keyed the sprocket wheels 3, 3, 3, 3.

1' is a collar cast on the leg and resting upon the base of the desk body B supporting the top A. Fitting over these screw legs and screwing upon them are the hollow legs or nuts, 2, 2, 2, 2. These are screw threaded as shown to engage the thread upon legs 1. These hollow legs are secured to the underside of the top A.

5, 6, and 7 are sprocket wheel, crank shaft, and crank respectively, located on the base of the body B.

4 is a sprocket chain running over the sprocket 5 and on the outside of each of the sprocket wheels 3, 3, 3, 3, on the base of the legs 1, 1, 1, 1. It is obvious that as the crank 7 is turned the screw legs 1, 1, 1, 1, will be turned, and they screwing in the hollow legs 2, 2, 2, 2, will raise or lower the top A as the case may be.

What I claim as my invention and desire to secure by Letters Patent is:—

In an adjustable desk the combination with the desk or cabinet B provided with a top B' suitable for a writing desk, screw rods 1, 1, 1, 1, incased in each corner thereof, each rod furnished with a sprocket wheel 3 on its lower end incased in the bottom of the desk B, and each rod provided also with a collar 1' resting upon the top of the bottom of the desk and supporting the rods, and the sprocket wheels 3, 3, 3, 3, the sprocket wheel 5, shaft 6, and crank 7, journaled in the base in the same plane with sprocket wheels 3. 3. 3. 3 the sprocket chain 4 running over the said sprocket wheels, of the adjustable desk top A supported by the hollow legs 2. 2. 2. 2. screw threaded upon their inside and adapted to engage the screw rods 1. 1. 1. 1. in the desk, and the hollow legs 2. 2. 2. 2. substantially as described and as and for the purpose set forth.

In testimony whereof I affix my signature in presence of two witnesses.

SYLVANUS J. REYNOLDS.

Witnesses:
   A. H. SWARTHOUT,
   GEO. A. MCLANDRESS.